United States Patent [19]

Bridges et al.

[11] Patent Number: 4,464,142
[45] Date of Patent: Aug. 7, 1984

[54] IGNITION DISTRIBUTOR SHAFT COUPLER

[75] Inventors: David B. Bridges; John J. Schulte, both of Anderson, Ind.

[73] Assignee: General Motors Corporation, Detroit, Mich.

[21] Appl. No.: 463,344

[22] Filed: Feb. 3, 1983

[51] Int. Cl.³ .......................... F16D 3/50; F16D 3/14; F16D 3/78; F02P 1/00
[52] U.S. Cl. .............................. 464/92; 123/146.5 A; 464/104; 464/900
[58] Field of Search .............................. 464/6, 70-74, 464/83, 85, 92-94, 102, 104, 105, 900; 123/146.5 R, 146.5 A, 90.31

[56] References Cited

U.S. PATENT DOCUMENTS

| | | | |
|---|---|---|---|
| 1,182,904 | 5/1916 | Hamilton et al. | 464/104 |
| 1,417,432 | 5/1922 | Walker | 464/73 |
| 1,463,396 | 7/1923 | Kratz | 464/105 X |
| 1,900,208 | 3/1933 | Swank | 464/71 |
| 2,025,825 | 12/1935 | Ricefield | 464/73 |
| 2,075,481 | 3/1937 | Thomas | 464/102 |
| 2,550,517 | 4/1951 | Bales | 464/70 |
| 2,620,640 | 12/1952 | Bales | 464/73 |
| 2,813,409 | 11/1957 | Wolcott | 464/102 |
| 2,892,328 | 6/1959 | Templeton | 464/85 |
| 3,368,371 | 2/1968 | Herman, Jr. | 464/20 |
| 3,411,323 | 11/1968 | Nehl | 464/74 |
| 3,540,233 | 11/1970 | Pearson | 464/74 |
| 3,577,970 | 5/1971 | King et al. | 123/146.5 A |
| 3,873,863 | 3/1975 | Pew | 464/900 X |
| 3,923,028 | 12/1975 | Campbell et al. | 123/146.5 A |

Primary Examiner—John Petrakes
Attorney, Agent, or Firm—C. R. Meland

[57] ABSTRACT

A shaft coupler for connecting a distributor shaft of an ignition distributor to the camshaft of an internal combustion engine. The coupler comprises a plastic member having a pair of drive lugs located in a groove formed in the end of the camshaft. The plastic member has another pair of lugs located in a groove formed in a driven metallic member that is connected to the distributor shaft. Rubber sleeves are disposed about these lugs and torque is transmitted from the plastic member to the metallic member through the sleeves. The two members are secured together by arms that extend from the plastic member through slots formed in the metallic member. The arms have teeth engaging a face of the metallic member.

6 Claims, 12 Drawing Figures

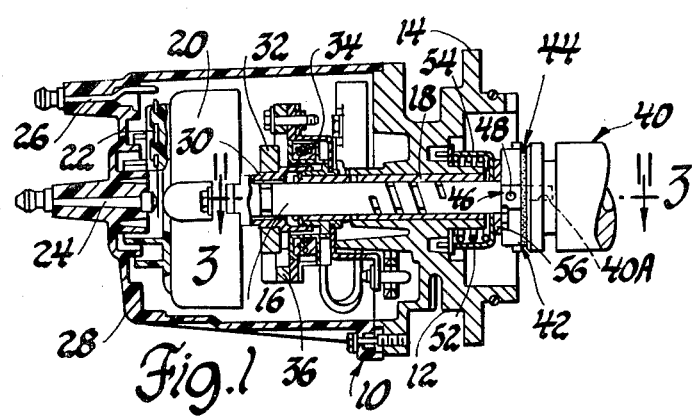
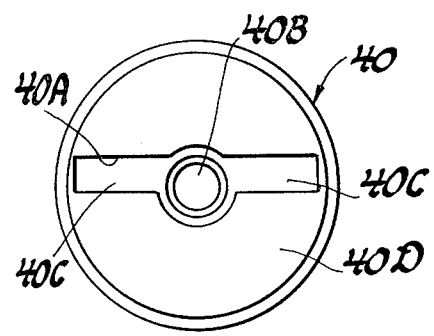
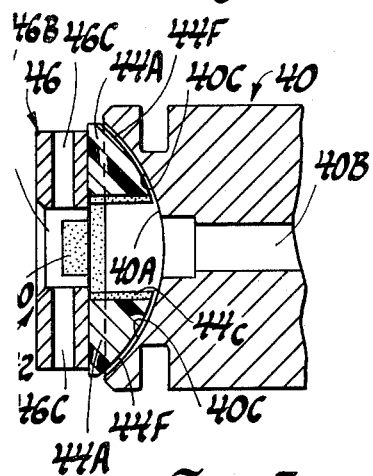
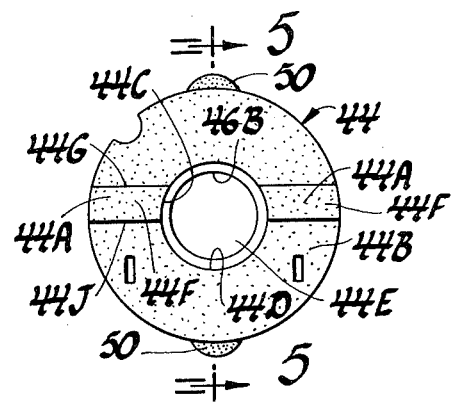
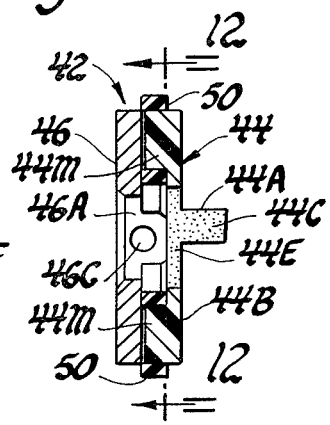
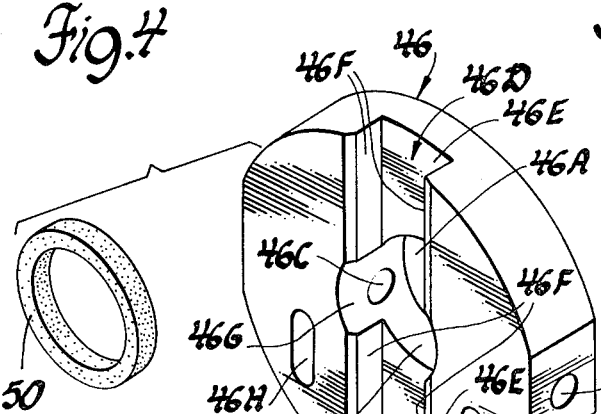

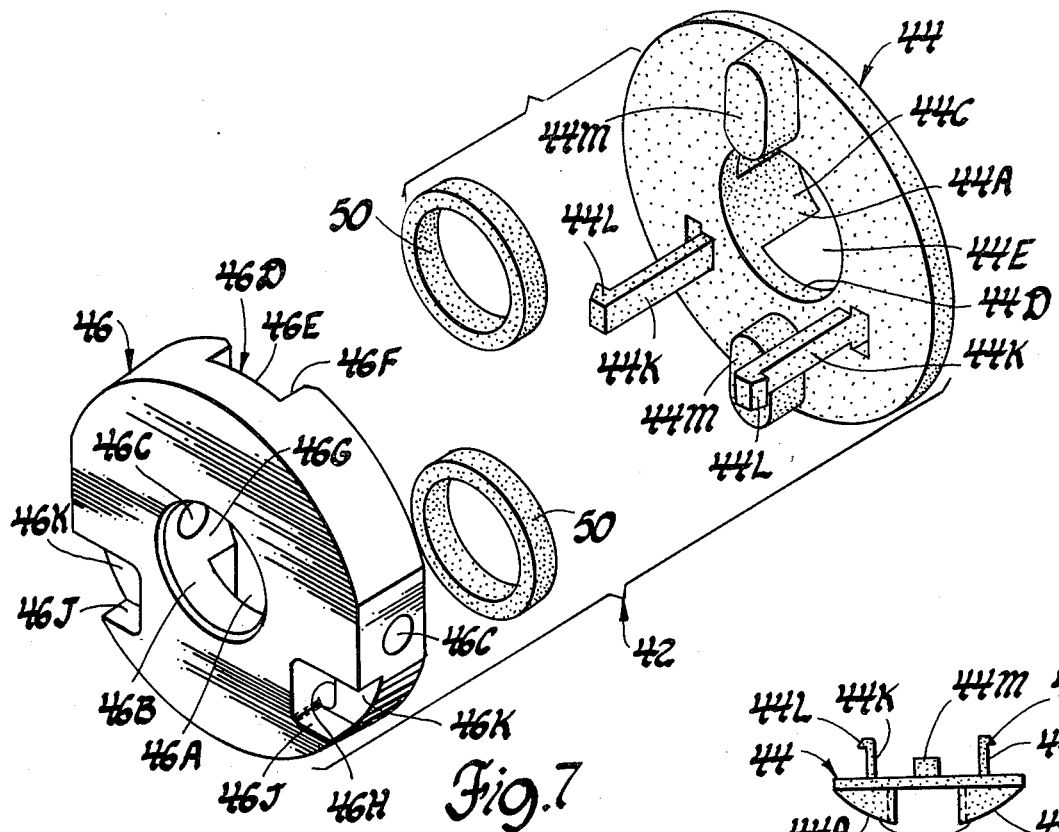
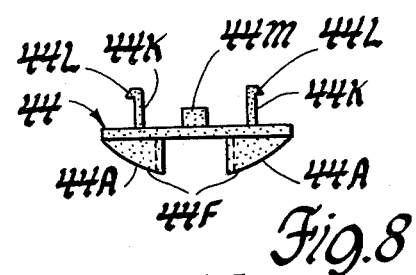
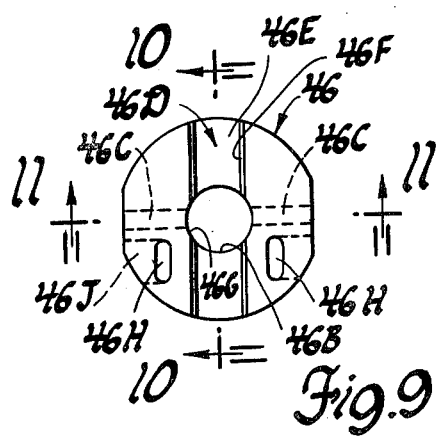
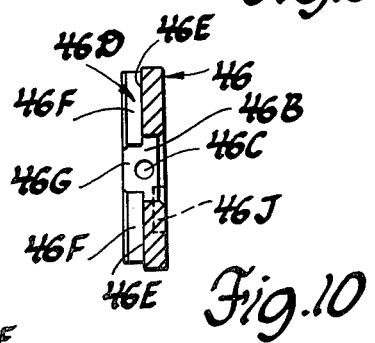
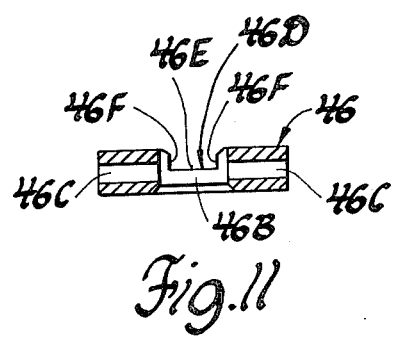
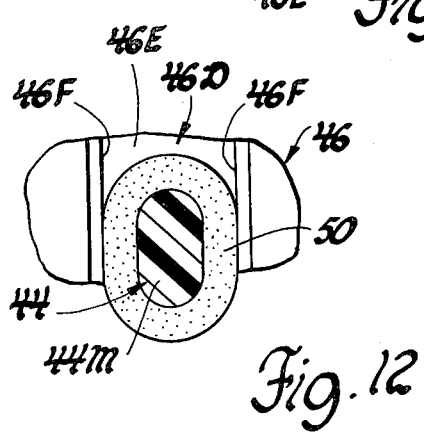

IGNITION DISTRIBUTOR SHAFT COUPLER

This invention relates to a coupling for connecting a pair of rotatable shafts and more particularly, to a coupling for driving the shaft of an ignition distributor from the camshaft of an internal combustion engine where the camshaft and distributor shaft are located in a coaxial relationship and where the ends of the shafts face each other.

An object of this invention is to provide an improved coupling of the type described that can accommodate misalignment between the camshaft and distributor shaft, that is arranged to reduce noise associated with drives of this type, and which is capable of dampening engine torque pulsations that might otherwise be applied to the distributor shaft. In carrying this object forward the coupling comprises a driving member formed of plastic material which has integral drive lugs extending from one face thereof that are located in a groove formed in the end of the camshaft. The opposite face of the plastic driving member has drive lugs or projections that are located within grooves formed in a metallic driven member that is connected to the distributor shaft. A rubber sleeve is disposed about each of the drive lugs that are located in the grooves of the metallic driven member so that torque is transmitted between the parts through the rubber sleeves. The plastic driving member has resilient arms extending through slots formed in the metal driven member that have teeth engaging the metal driven member for securing the plastic member to the metal member. The arms can slide in slots formed in the metallic drive member to permit relative radial movement of the two coupling parts. This radial movement is along an axis which is substantially perpendicular to the axis of the drive lugs that are positioned in the groove in the end of the camshaft.

The coupling that has been described permits relative movement between the coupling parts along an axis substantially perpendicular to the axis of the groove in the end of the camshaft. The rubber sleeves serve to dampen vibration, serve to reduce noise associated with drives of this type and dampen or smooth out engine torque pulsations that might otherwise be transmitted to the distributor shaft in any relative position of the coupling parts since the rubber sleeves slide with the plastic part relative to the metallic driven part.

IN THE DRAWINGS

FIG. 1 illustrates an ignition distributor connected to the camshaft of an internal combustion engine by the coupling device of this invention;

FIG. 2 is an end view of the engine camshaft shown in FIG. 1;

FIG. 3 is a partial sectional view taken along line 3—3 of FIG. 1;

FIG. 4 is an end view of the coupler that connects the end of the camshaft to the distributor shaft;

FIG. 5 is a sectional view taken along line 5—5 of FIG. 4;

FIGS. 6 and 7 are exploded perspective views of the coupling device of this invention;

FIG. 8 is a side view of one of the parts that is utilized to form the coupling device of this invention;

FIG. 9 is an end view of one of the coupling parts;

FIG. 10 is a sectional view taken along line 10—10 of FIG. 9;

FIG. 11 is a sectional view taken along line 11—11 of FIG. 10; and

FIG. 12 is a partial sectional view taken along line 12—12 of FIG. 5.

Referring to the drawings and more particularly to FIG. 1, the reference numeral 10 generally designates an ignition distributor for a four cylinder internal combustion engine that has an annular metallic base portion 12 that includes a flange 14. The flange 14 is adapted to be secured to the housing of an internal combustion engine in such a position that the distributor shaft 16 is aligned with the end of the camshaft of the engine. The distributor shaft 16 rotates within a sleeve bearing 18 located in a bore formed in the base 12.

The distributor shaft 16 drives a rotor 20 having a terminal means 22 that electrically connects a center electrode 24 and four outer electrodes 26 carried by the distributor cap 28 as the rotor 20 is rotated. The rotor 20 contains a centrifugal advance mechanism (not illustrated) which adjusts a metallic bushing 30 relative to the shaft 16 as a function of engine speed as is well known to those skilled in the art. The centrifugal advance mechanism can be, for example, of the type disclosed in the United States patent to Campbell et al., U.S. Pat. No. 3,923,028.

The bushing 30 carries a rotor 32 formed of magnetic material that has a plurality of external teeth. The rotor 32 forms part of a magnetic pickup including the annular pickup coil 34 and an annular permanent magnet 36. The pickup coil 34 and permanent magnet are rotatably supported as a unit by the upper end of the bearing 18 and this assembly can be adjusted by a vacuum unit, which has not been illustrated, in order to adjust spark timing in accordance with manifold vacuum all of which is well known to those skilled in the art. Magnetic pickups of the type described are illustrated in the above-referenced Campbell et al. U.S. Pat. No. 3,923,028.

The end of shaft 16 is connected to the end of camshaft 40 of an internal combustion engine by a coupling device generally designated by reference numeral 42 which will be described in detail hereinafter. The coupling device comprises annular parts 44 and 46. The part 44 is formed of plastic material and has a pair of tangs or drive lugs 44A which fit within a slot or groove 40A formed in the end of camshaft 40. The coupling part 46 is formed of metallic material and has circular holes that receive a tubular pin 48 that extends through the holes in the part 46 and through a radially extending hole (not illustrated) formed in the shaft 16 to connect the shaft and part 46. The pin 48 is press fitted to the holes in the part 46.

Referring now more particularly to FIGS. 2 and 3, it is seen that the slot or groove 40A, that is formed in the end of camshaft 40, extends substantially radially of the end face 40D of the camshaft and is slightly offset from the center axis of the crankshaft as illustrated. The camshaft 40 has a center oil passage 40B which intersects the groove or slot 40A. The inner wall portions 40C of the groove 40A are arcuately extending surfaces. The groove 40A can be formed by a circular side milling cutter having a diameter of approximately 50 millimeters with the result that the surfaces 40C have the shape of arcs of a circle having a radius of approximately 25 millimeters. The side walls of the groove 40A are parallel and extend normal to the arcuately extending walls 40C as shown in FIG. 1.

The coupling device 42 is illustrated in detail in FIGS. 4-12 and comprises the part 44 which is formed of a molded plastic material such as a glass filled nylon. The part 44 of the coupler has a pair of integral drive lugs or tangs 44A which extend axially from one face 44B thereof. The inner surfaces 44C of the lugs 44A are arcuately shaped and are extensions of portions of the circular wall 44D that defines a central opening 44E formed in the part 44.

The center line of lugs 44A is radially offset from a radial center line of part 44 as is best illustrated in FIG. 4. The amount of offset corresponds to the amount of offset of the axis of groove 40A of camshaft 40 with respect to a radial center line of the camshaft. The outer surfaces 44F of drive lugs 44A are arcuately shaped and are arcs of a circle having a radius of approximately 22.5 millimeters. The distance between edge 44G and face or surface 44B is slightly longer than the distance between edge 44J and face 44B so that surfaces 44F slant slightly from edge 44G to edge 44J. The difference in the distances is less than 0.5 millimeters.

The axial length of drive lugs 44A from face or surface 44B is so related to the depth of groove 40A of camshaft 40 that arcuate surfaces 44F are spaced from arcuate surfaces 40C when lugs 44A are inserted into groove 40A and surface 44B is engaged with the end 40D of the camshaft. As an example the surfaces may be spaced by about one millimeter.

The width of camshaft groove 40A is slightly larger than the width of drive lugs 44A. By way of example, the width of groove 40A may be about 4.5 to 4.53 millimeters and the width of drive lugs 44A about 4.39 to 4.47 millimeters.

The part 44 further includes a pair of integral resilient locator arms 44K. The resilient arms 44K have tooth portions 44L which, as will be described, snap over the other part of the coupler to hold the parts from axial separation.

The plastic drive part 44 further includes a pair of integral drive lugs 44M which extend in the same direction as the arms 44K. These drive lugs are oblong, and have curved end portions. The longitudinal axis of drive lugs 44M is perpendicular to the longitudinal axis of tangs or drive lugs 44A.

The driven member 46 of the coupler 42 is formed of a metallic material, for example a sintered steel. It has a central circular opening 46A defined by a circular wall 46B and a pair of holes 46C for receiving the pin 48. The part 46 has a pair of radially extending grooves 46D which are identical and which extend from the opening 46A to the outer periphery of part 46. The grooves 46D have a common longitudinal axis, are rectangular in cross-section and each groove is defined by a bottom wall 46E and sidewalls 46F extending normal to wall 46E. The walls 46E and 46F of the two grooves are all aligned and the two grooves together with the center semicircular portions 46G can be considered to be a single groove. The part 46 further has a pair of oblong openings 46H extending therethrough and a pair of recesses 46J which have flat inner walls 46K.

The coupling device utilizes two elastomeric sleeves, each designated by reference numeral 50 and each sleeve fits over a lug 44M. The sleeves are formed of a rubber elastomer, for example a Epichlorohydrin-ethylene oxide copolymer. The material is oil resistant, has low temperature flexibility, flame resistance and elastomeric properties similar to those of neoprene. The sleeves are shown in their unstretched circular state in FIGS. 6 and 7 and in a stretched assembled state in FIG. 12. The sleeves have a rectangular cross section, as illustrated in FIGS. 6 and 7. The axial length of the sleeves 50 is about the same as the axial length of lugs 44M.

The method of assembling the coupling device of this invention will now be described with particular reference to FIGS. 6 and 7. In the assembly of the coupling device the rubber sleeves 50 are slipped over the drive lugs 44M of the part 44 so that after assembly they are stretched to the oblong shape illustrated in FIG. 12. With the rubber sleeves embracing the lugs 44M the parts 44 and 46 are assembled by moving the arms 44K through the slots or openings 46H to a position wherein the teeth 44L snap into contact with the walls 46K of part 46. As the arms 44K are projected through openings 46H they are moved toward each other and when the teeth just move past walls 46K the arms spring away from each other to the position where teeth 44L engage walls 46K. When the arms 44K are projected through openings 46H the drive lugs 44M, with the attached rubber sleeves, become positioned within the grooves 46D and after the coupler is completely assembled as shown in FIG. 5, the rubber sleeves are positioned within the grooves 46D as illustrated in FIG. 12.

The width of the arms 44K is less than the length of the openings 46H so that the part 44 can slide relative to the part 46 along an axis aligned with the axis of grooves 46D. During this sliding movement the lugs 44M and the rubber sleeves 50, carried thereby, slide in grooves 46D. By way of example, where the depth of grooves 46D is 3.35 to 3.50 millimeters and their width is 7.92 to 8.08 millimeters the axial length of the rubber sleeves 50 is 3.10 to 3.30 millimeters and the axial length of drive lugs 44M is 3.15 to 3.30 millimeters. The width of lugs 44M is 4.30 to 4.38 millimeters and each lug 44M is about 7.5 millimeters long. The rubber sleeves 50 have a thickness of 1.89 to 2.39 millimeters. The diameter of a sleeve as measured between inner walls of a sleeve is about 6 millimeters. It can be seen from the foregoing dimensions that an outer wall of a rubber sleeve 50 contacts the side walls 46F of grooves 46D as shown in FIG. 12. It can also be seen from the dimensions set forth above that the ends of lugs 44M are slightly spaced from the bottom walls 46E of groove 46D when flat face surfaces of parts 44 and 46 are engaged. The engagement of the rubber sleeves, with groove side walls 46F, provides some slight frictional force opposing movement of the lugs and sleeves in grooves 46D.

When the coupling 42 is completely assembled as shown in FIG. 5 it is secured to the end of the distributor shaft 16 by aligning the holes 46C in the coupling part 46 with the radially extending hole in the distributor shaft and then press fitting the pin 48 into these holes. The end of the shaft 16 extends through hole 46A in part 46 and partially through the hole 44E in part 44 so that the end face of shaft 16 is spaced inwardly slightly from the annular face 44B of the part 44. The spacing is such that when the distributor is assembled to the engine the end face of the shaft 16 does not contact the end wall 40D of the camshaft 40.

The coupling 42 is spring biased toward the end of camshaft 40 by a spring 52 that engages a retainer member 54. The retainer engages a washer 56 which in turn engages one wall of the part 46 of the coupler. The retainer is conventional and has arms located within recesses formed in the base 12 to prevent rotation of the retainer. Prior to assembly of the distributor to the engine the spring urges the coupler 42 and the shaft 16 to a position wherein a portion of the bushing 30 engages an end of the sleeve bearing 18.

In assembling the distributor 10 to the engine the flange 14 of the base 12 is bolted to the engine and the tangs or lugs 44A engage the end wall 40D of the camshaft 40. With the distributor cap 28 removed the rotor is now rotated by hand causing rotation of the shaft 16 and coupler 42 and eventually the tangs or drive lugs 44A snap into the slot or groove 40A formed in the end of the camshaft. After final assembly the bushing 30 is out of contact with the end of the bearing sleeve 18. In the final assembled position the end face 44B of the part 44 is engaged with the end wall 40D of the camshaft 40. As previously mentioned, the axial dimension of the drive lugs or tangs 44A is such that surfaces 44F are slightly spaced from the arcuate walls 40C of the groove 40A formed in the end of the camshaft 40. The end face of shaft 16 is slightly spaced from the end wall 40D of camshaft 40 so that the ends of the two shafts do not contact each other.

The diameter of the distributor shaft 16 is slightly less than the diameter of opening 46A in part 46 to permit proper assembly of the coupler to the distributor shaft. The diameter of shaft 16 is less than the diameter of the opening 44E in part 44 and the relative diameter of these parts is selected to permit the part 44 to slide radially relative to part 46 by predetermined amounts. This accommodates shaft misalignment along the longitudinal axis of grooves 46D. Shaft misalignment along the longitudinal axis of lugs 44A is accommodated by the fact that the groove 40A in the end of the camshaft will properly receive the lugs 44A in various relative positions of the shafts.

The voltage pulses generated in pick-up coil 34 are utilized to control spark timing in a manner well known to those skilled in the art. In order to provide proper spark timing the position of the rotor 32 should consistently follow the position of the camshaft, that is, lost motion between the camshaft and distributor shaft should be avoided if consistent spark timing is to be achieved. The coupler of this invention minimizes lost motion and it also compensates for torque pulsations of the engine which are more severe in four cylinder engines than in six or eight cylinder engines. Lost motion is minimized since the lugs 44A have a close fit with camshaft groove 40A. Further the connection between parts 44 and 46 of the coupler does not permit any substantial relative rotation between these parts. Thus, the rubber sleeves 50 completely fill the space between lugs 44M and the walls 46F of grooves 46D and do not compress to such an extent as to allow lost motion between parts 44 and 46. In this regard, the fact that the rubber sleeves have a rectangular cross section aids in preventing lost motion. Thus, if a rubber O-ring were used, instead of sleeves 50, there would be line contact between the O-ring and the mating parts and the O-ring could be distorted to permit lost motion between parts 44 and 46.

The rubber sleeves, as mentioned, reduce noise and also compensate for torque pulsations of the engine. Thus, the rubber sleeves in transmitting torque between the camshaft and distributor shaft operate to dampen or smooth out the torque pulsations generated by the engine to reduce the adverse effect of these torque pulsations on ignition timing. Without the rubber sleeves the torque pulsations could, among other things, cause improper operation of the centrifugal advance mechanism and in general the application of a sharply varying torque to the distributor shaft 16 is to be avoided for proper operation of the distributor.

As previously mentioned, the drive lugs 44A and the groove 40A in the end of the camshaft are both offset from the radial center line of these parts. The reason this is done is to ensure that the drive shaft can only have one rotative position relative to the camshaft when the drive lugs 44A are inserted in the camshaft groove 40A. The openings 46H are both located at one side of a radial center line of part 46. This ensures that the part 44 will be assembled in the proper relationship to part 46.

It has been pointed out that lugs 44M that carry the rubber sleeves 50 are oblong and, because of this, certain lengths of a rubber sleeve 50 will be in contact with the parallel flat planar side walls of the lugs and the parallel flat planar side walls 46F of the grooves 46D as illustrated in FIG. 12. This ensures face to face contact between the rubber sleeves and the side walls of the parts over rectangular areas of the rubber sleeves as opposed to line contact that would occur if a rubber O-ring were used.

The purpose of recesses 46J is to accommodate the teeth 44L of arms 44K so that the teeth do not interfere with the face to face engagement of washer 56 and the end face of part 46. Putting it another way, the ends of teeth 44L are located within the axial length of the recesses so that they do not engage washer 56.

The embodiments of the invention in which an exclusive property or privilege is claimed are defined as follows:

1. A coupling for driving the shaft of an ignition distributor from the camshaft of an internal combustion engine comprising, a first member adapted to be driven by the camshaft having first lug means extending axially from one face thereof in one direction and having second lug means extending axially in an opposite direction, the first lug means adapted to mesh with a groove formed in the end of the camshaft, the longitudinal axis of said first lug means being perpendicular to the longitudinal axis of said second lug means, a second driven member adapted to be connected to the distributor shaft having a radially extending groove, the open end of which faces said first member, said second lug means being located in said groove in said second member, means operative to prevent axial separation of said members while permitting radial movement of said first member relative to said second member along the longitudinal axis of the groove in said second member, said last named means including means extending from one of said members and engaging the other member, and an elastomeric sleeve disposed about and engaging said second lug means having outer wall portions engaging side wall portions of the groove in said second member.

2. A coupling for driving the shaft of an ignition distributor from the camshaft of an internal combustion engine comprising, a first member having lug means extending axially from one face thereof adapted to be axially inserted into a groove formed in the end of the camshaft, the lug means having arcuately extending faces of substantially the same shape as an inner surface of the camshaft groove, a second driven member adapted to be connected to the distributor shaft having radially extending aligned groove portions the open ends of which face the first member, a pair of radially spaced lugs extending from said first member located in said groove portions in said second member, the longitudinal axis of said pair of lugs being perpendicular to the longitudinal axis of said lug means, means extending from one of said members and engaging the other member to prevent axial separation of said members while permitting radial movement of said first member relative to said second member in a direction along the longitudinal axis of the groove portions in the second member, and an elastomeric sleeve disposed about and engaging each of said radially spaced lugs having outer wall portions engaging side wall portions of the groove portions in said second member.

3. A coupling for driving the shaft of an ignition distributor from the camshaft of an internal combustion engine comprising, a first member having lug means extending axially from one face thereof adapted to mesh with a groove formed in the end of the camshaft, a second member adapted to be connected to the distributor shaft having aligned radially extending grooves facing the first member and having a pair of slots extending parallel to said grooves, a pair of radially spaced lugs extending from said first member located in portions of said grooves in said second member, a pair of arms extending from said first member through said slots having means engaging said second member to prevent axial separation of said members, the length of said slots and width of said arms being so dimensioned as to permit limited relative radial movement of said members in a direction along the longitudinal axis of the grooves in the second member, and an elastomeric sleeve disposed about and engaging each of said radially spaced lugs having outer wall portions engaging side wall portions of the grooves in said second member.

4. A coupling for driving the shaft of an ignition distributor from the camshaft of an internal combustion engine comprising, a first member adapted to be driven by the camshaft having lug means extending axially from one face thereof in one direction and having a pair of radially spaced lugs extending axially in an opposite direction, said lug means adapted to mesh with a groove formed in the end of the camshaft, the longitudinal axis of said lug means being perpendicular to the longitudinal axis of said pair of radially spaced lugs, a second driven member adapted to be connected to the distributor shaft having a central opening for receiving the distributor shaft and having radially extending aligned grooves intersecting said central opening, said pair of radially spaced lugs located in said grooves in said second member and located at opposite sides of said central opening, means for preventing axial separation of said members while permitting relative radial movement of said members along the longitudinal axis of said grooves in said second member, and an elastomeric sleeve embracing each of said pair of radially spaced lugs having outer wall portions engaging side wall portions of the grooves in said second member.

5. A coupling for driving the shaft of an ignition distributor from the camshaft of an internal combustion engine comprising, a first member formed of plastic material adapted to be driven by the camshaft having integral lug means extending axially from one face thereof in one direction and having a pair of aligned integral oblong radially spaced lugs each having parallel planar side walls extending axially in an opposite direction, said lug means adapted to mesh with a groove formed in the end of the camshaft, the longitudinal axis of said lug means being perpendicular to the longitudinal axis of said pair of radially spaced lugs, said first member having a central opening to receive at least a portion of the distributor shaft, a second metallic driven member adapted to be connected to the distributor shaft having a central opening for receiving the distributor shaft and having aligned radially extending grooves of rectangular cross section intersecting said central opening, said second member having a pair of slots extending parallel to the grooves in said second member, said pair of radially spaced lugs located in said grooves in said second member and located at opposite sides of said central openings, a pair of integral flexible arms extending from said first member through said slots having teeth engaging said second member to prevent axial separation of said members, the length of said slots and width of said arms being so dimensioned as to permit limited relative radial movement of said members in a direction along the longitudinal axis of the grooves in the second member, and an elastomeric sleeve of rectangular cross section embracing each of said pair of radially spaced lugs having planar outer wall portions engaging planar side wall portions of the grooves in said second member, the axial length of said sleeves being substantially equal to the axial length of said pair of radially spaced lugs.

6. A coupling for driving the shaft of an ignition distributor from the camshaft of an internal combustion engine comprising, a first member adapted to be driven by the camshaft having lug means extending axially from one face thereof in one direction and having a pair of radially spaced oblong lugs each having parallel planar side walls extending axially in an opposite direction, the lug means adapted to mesh with a groove formed in the end of the camshaft, the longitudinal axis of said lug means being perpendicular to the longitudinal axis of said pair of radially spaced lugs, a second driven member adapted to be connected to the distributor shaft having aligned radially extending grooves of rectangular cross section the open ends of which face said first member, said radially spaced oblong lugs being located in said grooves in said second member, means operative to prevent axial separation of said members while permitting radial movement of said first member relative to said second member along the longitudinal axis of the grooves in said second member, said last-named means including means extending from one of said members and engaging the other member, and an elastomeric sleeve of rectangular cross section disposed about and engaging each of said pair of radially spaced oblong lugs having outer substantially planar wall portions engaging planar side wall portions of the grooves in said second member.

* * * * *